Nov. 8, 1960    F. B. HALFORD ET AL    2,959,394
STATORS OF MULTI-STAGE AXIAL FLOW COMPRESSORS OR TURBINES
Filed Dec. 11, 1953    3 Sheets-Sheet 3

INVENTORS
FRANK B. HALFORD &
GEORGE F. CLARKE
BY
Holcombe, Wardwell & Brisebois ATTORNEYS

United States Patent Office 2,959,394
Patented Nov. 8, 1960

2,959,394

STATORS OF MULTI-STAGE AXIAL FLOW COMPRESSORS OR TURBINES

Frank Bernard Halford, Edgware, and George Frederick Clarke, Stanmore, England, assignors to The De Havilland Engine Company Limited, Edgware, England, a British company Filed Dec. 11, 1953, Ser. No. 397,741

5 Claims. (Cl. 253—78)

This invention relates to multi-stage axial flow gas compressors or turbines of the kind comprising a rotor carrying a series of rings of blades (hereinafter called rotor-blade rings) and a stator carrying stationary blade rings (hereinafter called stator blade rings) each of which lies between two adjacent rotor blade rings, and has for its object to provide an improved stator construction for such a multi-stage axial flow gas compressor or turbine, which will be particularly but not exclusively applicable to propulsion units of the combustion turbine type for aircraft designed to fly at supersonic speeds, the term "aircraft" being used in its broad sense to include piloted or unpiloted aircraft and missiles having propulsion units for self-propulsion.

When an air compressor forming part of an aircraft propulsion unit of the combustion turbine type is operating under supersonic conditions the air passes through the compressor at a relatively high temperature due to the ram effect in the air intake to the compressor, with the result that in many cases it is not feasible to use light alloys for the stator casing or for the stator or rotor blades. One of the objects of the present invention is thus to provide a construction of a stator for an axial flow compressor which will be particularly but not exclusively suited to manufacture in steel or titanium and calling for the minimum of welding and yet providing a light and robust assembly suitable for use at supersonic speeds.

A stator construction for a multi-stage axial flow gas compressor or turbine of the kind referred to according to the present invention comprises a tubular outer casing, one or more annular supporting rings within the casing each having a flange provided with an external cylindrical locating surface engaging an internal cylindrical locating surface on the casing, means for locating the supporting rings axially within the casing, and at least one ring of inwardly extending stator blades each having a root portion one end face at least of which engages the face of the flange on a supporting ring and is rigidly connected to that flange, as by at least two rivets or the equivalent.

Preferably each blade root is located axially between the adjacent faces of two flanges one at least of which is the appropriate flange of a supporting ring while the other may be a flange of another supporting ring or a flange on a ring constituting a distance piece lying between two stator blade rings or between a stator blade ring and an internal flange on the tubular outer casing.

Thus in one convenient arrangement the supporting ring or each supporting ring has two radial flanges one of which is connected to the roots of blades in an adjacent stator blade ring while the other abuts against an internal flange formed on or rigidly secured to the tubular outer casing and thus serving as part of the means for locating the supporting ring or rings axially.

Preferably in any case the flange on the supporting ring or on each supporting ring to which the roots of the blades in a stator blade ring are connected is itself formed with a cylindrical locating surface which engages the appropriate internal cylindrical locating surface on the tubular outer casing and means are provided in addition for rigidly connecting such flange to the tubular outer casing. For example, the flange on each supporting ring which engages a cylindrical circumferential locating surface on the interior of the tubular outer casing may be connected to the tubular outer casing by a series of radially arranged bolts passing through holes in the tubular outer casing and engaging screwthreaded holes in the flange of the supporting ring, and preferably in locally thickened areas of that flange.

As stated each blade may conveniently be connected to the flange of a supporting ring or to the flanges of two supporting rings between which the root of the blade lies by rivets, and in this case the connection between the blade root and each flange is preferably by at least two circumferentially spaced rivets passing through flanges at the ends of the root or so called platform from which the blade proper springs. Thus each of such platforms is conveniently of approximately rectangular form with flanges at its ends. Moreover the base of the platform preferably increases in thickness from its four edges towards its centre as by having its base remote from the blade made of truncated four sided pyramidical form, for the purpose of providing a more even distribution of stresses in the platform and blade root fillet and saving weight.

The arrangement of the various supporting rings, distance pieces, when provided, and other parts will vary according to the number of stages of the compressor and other factors but one construction according to the invention, and a modification thereof, are shown by way of example in the accompanying drawings, in which Figure 1 is a lengthwise cross-section of a portion of an axial flow compressor, showing the essential parts of the stator and the bladed section of the rotor within it, the arrangement being shown in half section on the principal axis of the device for ease of illustration on an adequate scale;

In the construction shown in Figures 1 to 4 the stator assembly comprises a tubular outer casing A, which may be formed of comparatively thin section steel or titanium and has rigidly secured, as by welding, to its ends and at a number of intermediate points in its length, annular radially extending internal flanges $A^1$, $A^2$, $A^3$, $A^4$, $A^5$.

Figure 2:
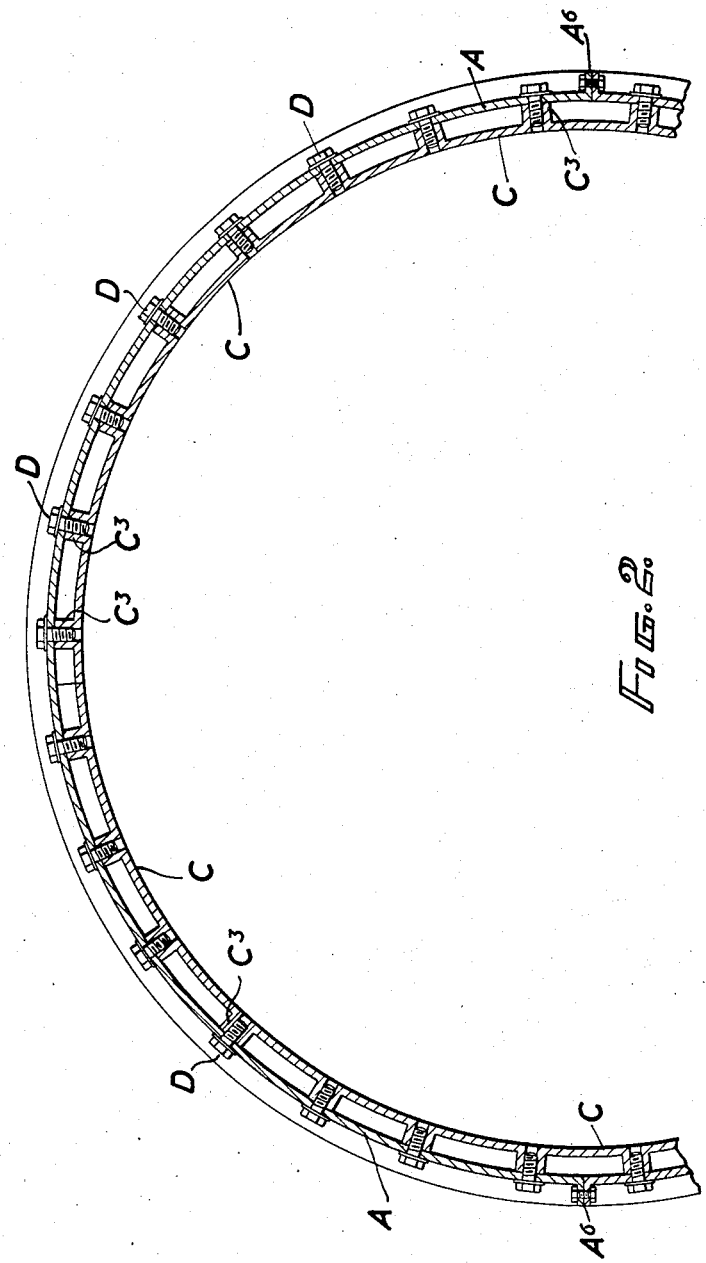
Figure 2 is a partial cross section through the stator only of the construction shown in Figure 1 taken on the line 2—2 of Figure 3, omitting the stator blades.

Also formed within the tubular casing A at spaced points in its length are a series of shallow internal ribs extending circumferentially and having inner circumferential surfaces B, $B^1$, $B^2$, $B^3$, $B^4$, $B^5$, $B^6$, $B^7$ which constitute internal circumferential locating surfaces in a manner hereinafter described. The tubular outer casing A is formed in two halves, as shown in Figure 2, separable in a diametral plane containing the axis of the casing, these two halves being bolted together by means of bolts passing through abutting longitudinal flanges $A^6$ on the two halves of the casing so as to permit the assembly therein of the supporting rings and other parts hereinafter described.

In the construction shown the compressor has five stages and the stator assembly carries six stator blade rings five of which are alternating with five rotor blade rings.

Arranged at the entry or low pressure end of the tubular casing A and immediately within the internal flange $A^1$ is a supporting ring C of channel section with the two flanges $C^1$ and $C^2$, of the channel facing outwards. The flange $C^1$ bears, as shown, against the inner face of the flange $A^1$ while the flange $C^2$ has an external circumferential locating surface which engages the internal circumferential locating surface B so that the supporting ring C is accurately located within the tubular casing A.

The flange $C^2$ is moreover provided with a series of circumferentially displaced thickenings $C^3$ in each of which is formed a radially extending screwthreaded bore engaged by a bolt D passing through a hole in the tubular casing A so that the supporting ring C is rigidly secured to the casing A by these bolts. In the example shown thirty of these bolts are provided in this flange.

Arranged on the side of the flange $A^2$ adjacent to the flange $A^1$ is a second supporting ring E similar to the supporting ring C except that it is of shorter axial length, the flange $E^1$ of the supporting ring E bearing against the adjacent face of the flange $A^2$ while the flange $E^2$ has an external circumferential locating surface which engage the internal circumferential locating surface $B^1$. The flange $E^2$ also has thickenings $E^3$ corresponding to the thickenings $C^3$ with screwthreaded radial bores therein engaged by bolts D similar in arrangement and function to the bolts D associated with the thickenings $C^3$.

Carried by the flanges $C^2$ and $E^2$ of the supporting rings C and E is the first ring of stator blades, each of these blades F having a root portion or platform $F^1$ which is of shallow channel section as shown with the flanges $F^2$, $F^3$ facing outwards and the end faces of the flanges engaging the adjacent faces of the flanges $C^2$ and $E^2$. Each of the flanges $F^2$ and $F^3$ is rigidly connected to its associated flange $C^2$ or $E^2$ by at least two circumferentially spaced longitudinally extending rivets arranged parallel to and within the inner circumference of the supporting casing A, as indicated at $D^1$ in Figure 3, and which pass through circumferentially spaced holes $D^2$ in the flanges $F^2$ and $F^3$ as shown in Figure 4.

Figure 3:
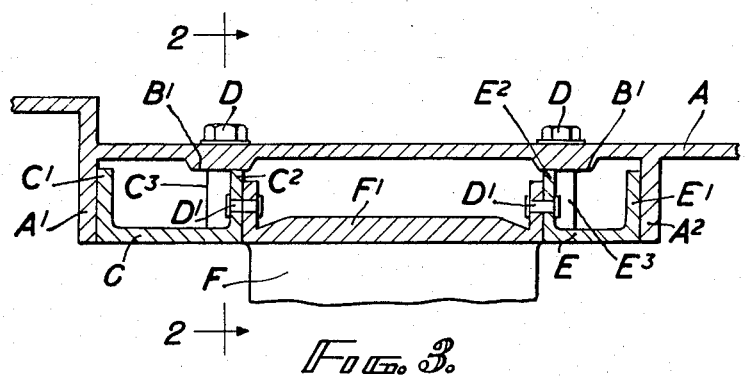
Figure 3 is an enlarged cross sectional view showing the method of attachment of the stator blades in the construction shown in Figure 1.
Figure 4:
Figure 4 is a plan view of the base of the blade shown in Figure 3.

The rectangular platform $F^1$ of each blade F has its outer face made of truncated four sided pyramidical form so as to increase progressively in thickness from its edges towards its centre as shown more particularly in Figures 3 and 4 for the purposes of improving stress distribution and thus enabling weight to be saved.

Figure 1:
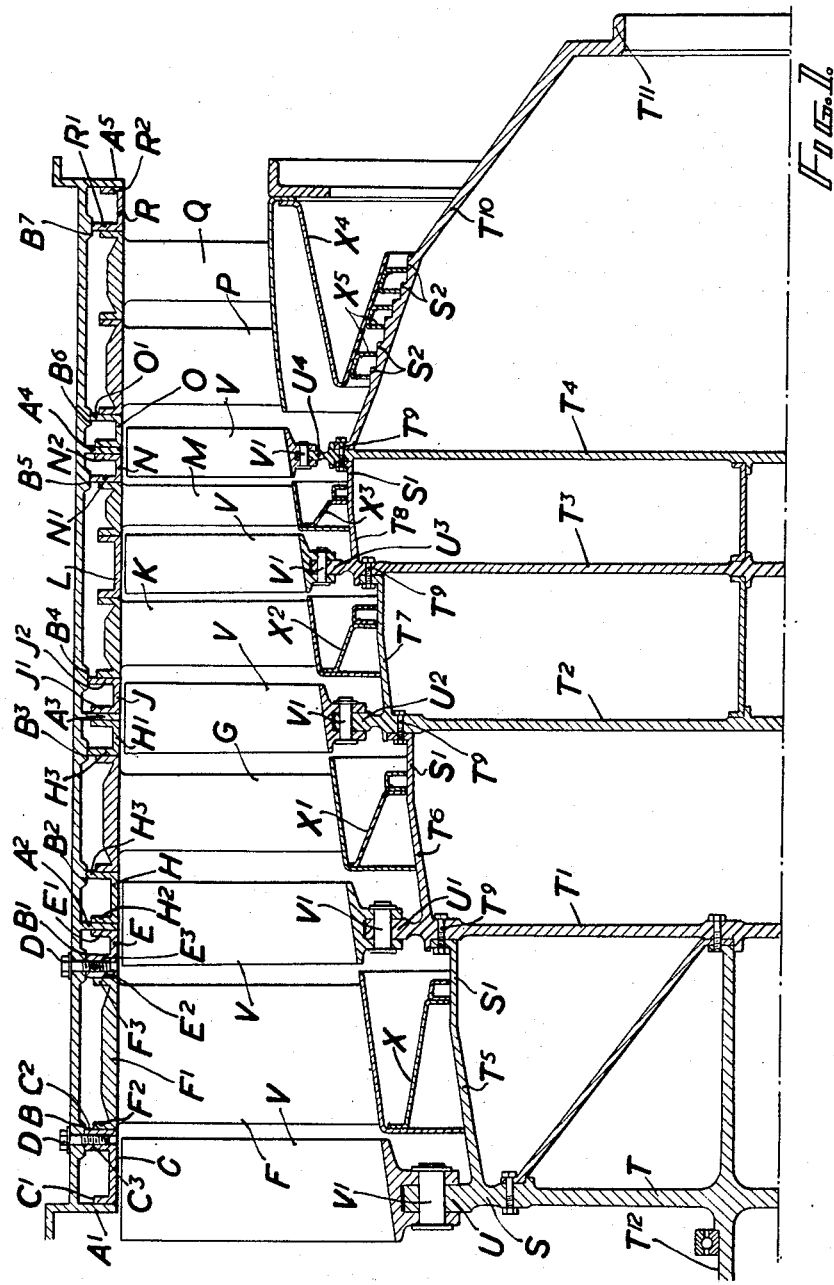

The roots of the blades G constituting the next stator blade ring are of the same general form as those of the blades F and are similarly riveted to two supporting rings H, $H^1$, of channel section, the outer flanges, $H^2$, of the supporting rings H and $H^1$ lying respectively against the adjacent faces of the flanges $A^2$ and $A^3$ while their inner flanges, $H^3$, have external circumferential locating surfaces engaging the internal circumferential locating surfaces $B^2$ and $B^3$ as shown. In addition the flanges $H^3$ each have formed thereon a series of circumferentially displaced thickenings similar to the thickenings $C^3$ and $E^3$ on the flanges $C^2$ and $E^2$ with screwthreaded bores therein engaged by bolts passing through holes in the tubular casing A as illustrated in Figures 1 and 2 so as to secure the supporting rings H and $H^1$ securely to the casing A. For convenience of illustration the section of Figure 1 has been taken as being a plane other than that in which the thickenings in the rings H and $H^1$ lie so that the thickenings and bolts do not appear in the drawing.

On the side of the flange $A^3$ remote from the supporting ring $H^1$ lies a supporting ring J, one flange $J^1$, of which lies against an adjacent face of the flange $A^3$ while its other flange, $J^2$, has an external circumferential locating surface engaging the internal circumferential locating surface $B^4$. The flange $J^2$ has secured to it by rivets the adjacent flange of each of the roots of the next ring K of stator blades in the same manner as the blades F (illustrated in Figure 3) and G are secured to their supporting rings. The other flanges of the roots of the blades K are similarly secured to the adjacent flange of a channel section annular distance piece L the other flange of which is similarly secured to the adjacent flanges of the roots of the next ring of stator blades M. The other flanges of the roots of the blades M are similarly riveted to one flange $N^1$ of a supporting ring N the other flange $N^2$ of which bears against the adjacent face of the flange $A^4$. The flange $N^1$ has an external circumferential locating face which engages the internal circumferential locating face $B^5$ and is also provided with thickenings (not shown) similar to the thickenings $C^3$ and $E^3$ having screwthreaded bores engaged by bolts which act in the same manner as the bolts D to secure the supporting ring N firmly to the casing A.

On the side of the flange $A^4$ remote from the blades M lies a supporting ring O the adjacent flange of which bears against the flange $A^4$ while its other flange, $O^1$, has an external circumferential locating surface engaging the surface $B^6$ and is provided with thickenings (not shown) having screwthreaded bores engaged by bolts securing it to the casing A, all in a similar manner to that in which the supporting rings C and E are secured to the casing A.

The flange $O^1$ has connected to it by riveting, the adjacent flanges on the roots of a ring of stator blades P. The other flange of each of these blade roots is connected by riveting to the adjacent flange of a blade in an adjacent blade ring Q so as to provide a pair of blades. The two blade rings P and Q together act as straighteners for the air leaving the compressor. The outer flange of each of the blades in the ring Q is riveted to the adjacent flange, $R^1$, of a supporting ring R the other flange $R^2$ of which bears against the inner face of the flange $A^5$, the flange $R^1$ having an external circumferential locating surface engaging the surface $B^7$ and being provided with thickenings (not shown) with screwthreaded holes to receive bolts by which the flange $R^1$ is secured to the casing A in a similar manner to the flanges $C^2$ and $E^2$.

The form of the blade roots in each of the blade rings G, K, M, P and Q is similar to that of the roots of the blades in the ring F apart from dimensional changes due to the different axial lengths of the roots.

The inner ends of the blades in the blade rings F, G, K and M conveniently carry annular structures indicated at X, $X^1$, $X^2$ and $X^3$ which co-operate with surfaces $S^1$ on a rotor S to form seals between the stages of the compressor while the blade rings P and Q together carry a sealing structure $X^4$ having a plurality of sealing members $X^5$ co-operating with cylindrical surfaces $S^2$ on the rotor to form a seal around the delivery end of the rotor.

The rotor, in the construction shown by way of example, comprises a series of parallel coaxial discs T, $T^1$, $T^2$, $T^3$, $T^4$ spaced apart and rigidly connected to one another by tubular distance pieces $T^5$, $T^6$, $T^7$, $T^8$, which have parts constituting the sealing surfaces $S^1$ formed integral respectively with the discs T, $T^1$, $T^2$ and $T^3$ and are connected by bolts $T^9$ respectively to the discs $T^1$, $T^2$, $T^3$ and $T^4$. Each of the discs T, $T^1$, $T^2$, $T^3$, $T^4$ has a radial flange U, $U^1$, $U^2$, $U^3$, $U^4$ formed on its edge and constituting in effect a radial extension thereof beyond the adjacent tubular distance piece, $T^5$, $T^6$, $T^7$ or $T^8$, and rings of rotor blades V are connected by pins $V^1$ respectively to the flanges U, $U^1$, $U^2$, $U^3$ and $U^4$ as shown. Secured to the disc $T^4$ is a drum-like part $T^{10}$ on which the surfaces $S^2$ referred to above are formed, this drum-like part having a hollow boss $T^{11}$ at its end, while the disc T has a tubular extension $T^{12}$ formed on it so that the rotor can be supported in bearings respectively from the hollow boss $T^{11}$ and the tubular extension $T^{12}$.

Figure 5:
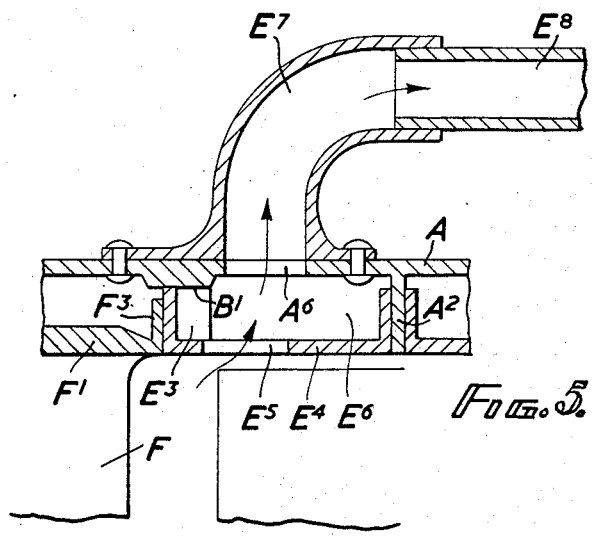
Figure 5 is a sectional side elevation on an enlarged scale showing the modification referred to of the construction shown in Figures 1 to 4.

In the modification illustrated in Figure 5, assumed to be applied to a compressor generally similar to that shown in Figures 1 to 4 the spacing of the flange $A^2$ and surface $B^1$ is somewhat modified to allow for the interposition of a supporting ring $E^4$ which is somewhat longer than the ring E and is provided with one or more apertures $E^5$ therein through which air compressed by the first stage of the compressor can enter the space $E^6$ between its flanges. One or more apertures $A^6$ are also formed in the casing A through which air from the space $E^6$ can enter a collecting chamber $E^7$ and to deliver thereform through a pipe $E^8$ to bearing or other parts to be sealed.

It will be understood that the kind of rotor shown herein associated with a stator construction according to the present invention is for convenience only, and that other forms of rotor may be employed with the present invention.

What we claim as our invention and desire to secure by Letters Patent is:

1. A stator construction for a multi-stage axial flow gas compressor or turbine of the kind comprising a rotor carrying a series of rings of blades and a stator carrying a plurality of stationary blade rings which lie between two adjacent rotor blade rings, said stator comprising a longitudinally divided tubular outer casing provided with an internally facing cylindrical locating surface, at least one annular supporting ring within the casing having a radially projecting flange provided with an externally facing cylindrical locating surface engaging said internally facing cylindrical locating surface on the casing, abutments on said casing projecting radially inward therefrom, which abutments engage an axial extremity of the said supporting ring and axially locate it axially within the casing, at least one ring of inwardly extending stator blades each blade including a root portion one end face of which engages the adjacent face of the flange on the said supporting ring and at least two spaced axially extending rivets passing through each of said root portions and said flange and constituting the sole means of securing the said blade root portion rigidly to said flange of said supporting ring.

2. A stator construction as claimed in claim 1 including an internal flange rigid with the casing and constituting part of said abutment means, and in which the supporting ring has two radial flanges one of which is connected to the roots of the blades by the said rivets while the other abuts against said internal flange rigid with the casing.

3. A stator construction as claimed in claim 2 including means securing the flange of the supporting ring which is connected directly to the roots of the blades directly and rigidly to the casing at a plurality of circumferentially spaced points.

4. A stator construction as claimed in claim 3 in which the means for directly connecting said flange on said supporting ring to the casing comprises a plurality of radial bolts passing through holes in the casing and engaging screw-threaded bores in the flange on the supporting ring.

5. A stator construction as claimed in claim 1 in which the said root portion of each blade is formed at at least one of its ends with a flange, and in which the said spaced rivets pass through said last mentioned flange and the flange on the adjacent supporting ring.

References Cited in the file of this patent

UNITED STATES PATENTS

| | | |
|---|---|---|
| 2,457,833 | Redding | Jan. 4, 1949 |
| 2,623,728 | Feilden | Dec. 30, 1952 |
| 2,660,413 | Haworth | Nov. 24, 1953 |
| 2,722,373 | Ledwith et al. | Nov. 1, 1955 |
| 2,742,224 | Burhans | Apr. 17, 1956 |

FOREIGN PATENTS

| | | |
|---|---|---|
| 312,374 | Switzerland | Oct. 19, 1951 |
| 586,562 | Great Britain | Mar. 24, 1947 |
| 586,564 | Great Britain | Mar. 24, 1947 |
| 622,895 | Great Britain | May 9, 1949 |